US012689986B2

(12) United States Patent
Sun et al.

(10) Patent No.: US 12,689,986 B2
(45) Date of Patent: Jul. 21, 2026

(54) SYSTEM AND METHOD FOR IMPROVING SUCCESS RATE OF BEACON FRAME RECEPTION IN WIRELESS NETWORKS

(71) Applicant: Beken Corporation, Shanghai (CN)

(72) Inventors: Qiang Sun, Shanghai (CN); Yin Wang, Shanghai (CN); Guochu Chen, Shanghai (CN)

(73) Assignee: Beken Corporation, Shanghai (CN)

( * ) Notice: Subject to any disclaimer, the term of this patent is extended or adjusted under 35 U.S.C. 154(b) by 286 days.

(21) Appl. No.: 18/679,293

(22) Filed: May 30, 2024

(65) Prior Publication Data

US 2025/0338221 A1      Oct. 30, 2025

(30) Foreign Application Priority Data

Apr. 26, 2024    (CN) ......................... 202410518874.X

(51) Int. Cl.
*H04W 52/02*                (2009.01)
(52) U.S. Cl.
CPC .............................. *H04W 52/0248* (2013.01)
(58) Field of Classification Search
CPC ......... H04W 52/0248; H04W 52/0216; H04W 52/0229; H04W 72/0446; H04W 72/1263; Y02D 30/70
See application file for complete search history.

(56) References Cited

U.S. PATENT DOCUMENTS

| | | | | |
|---|---|---|---|---|
| 12,219,476 | B2 * | 2/2025 | Huang | ............. H04W 52/0229 |
| 2013/0034004 | A1 * | 2/2013 | Mannemala | ...... H04W 52/0216 |
| | | | | 370/252 |
| 2022/0116893 | A1 * | 4/2022 | Lu | ....................... H04W 56/001 |
| 2023/0362794 | A1 * | 11/2023 | Kishore | ............... H04W 48/10 |
| 2023/0388926 | A1 * | 11/2023 | Kishore | ........... H04W 28/0278 |

* cited by examiner

*Primary Examiner* — Kevin T Bates

*Assistant Examiner* — Poonam Sharma

(74) *Attorney, Agent, or Firm* — Schwegman Lundberg & Woessner, P.A.

(57)      ABSTRACT

A system and method are provided for improving success rate of beacon frame reception from an access point (AP) in wireless networks by determining an STA wake-up time to compensate for inaccuracy in the STA's clock, optimizing client device's wake-up schedules for reliable data transmission and minimizing power usage. The client device determines the optimal STA wake-up time by analyzing beacon frames, identifying differences between the STA's clock and a reference time. Optimizing the wake-up schedules of the STA from a power-saving mode allows the STA to prepare in advance of beacon frame broadcasts, ensuring their consistent reception.

20 Claims, 9 Drawing Sheets

TIMELINE 316

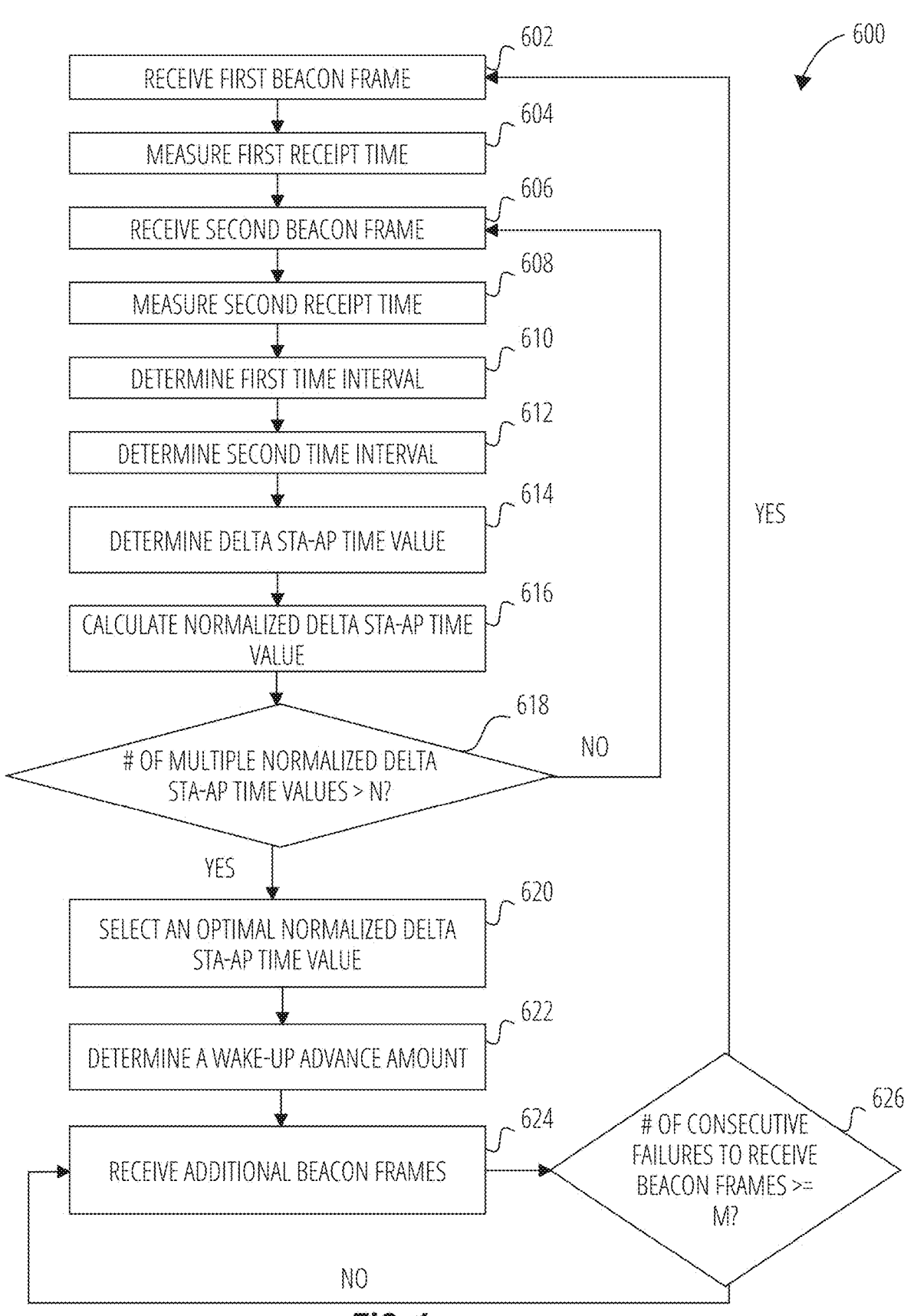

602 RECEIVE FIRST BEACON FRAME

604 MEASURE FIRST RECEIPT TIME

606 RECEIVE SECOND BEACON FRAME

608 MEASURE SECOND RECEIPT TIME

610 DETERMINE FIRST TIME INTERVAL

612 DETERMINE SECOND TIME INTERVAL

614 DETERMINE DELTA STA-AP TIME VALUE

616 CALCULATE NORMALIZED DELTA STA-AP TIME VALUE

618 # OF MULTIPLE NORMALIZED DELTA STA-AP TIME VALUES > N?

NO

YES

620 SELECT AN OPTIMAL NORMALIZED DELTA STA-AP TIME VALUE

622 DETERMINE A WAKE-UP ADVANCE AMOUNT

624 RECEIVE ADDITIONAL BEACON FRAMES

626 # OF CONSECUTIVE FAILURES TO RECEIVE BEACON FRAMES >= M?

YES

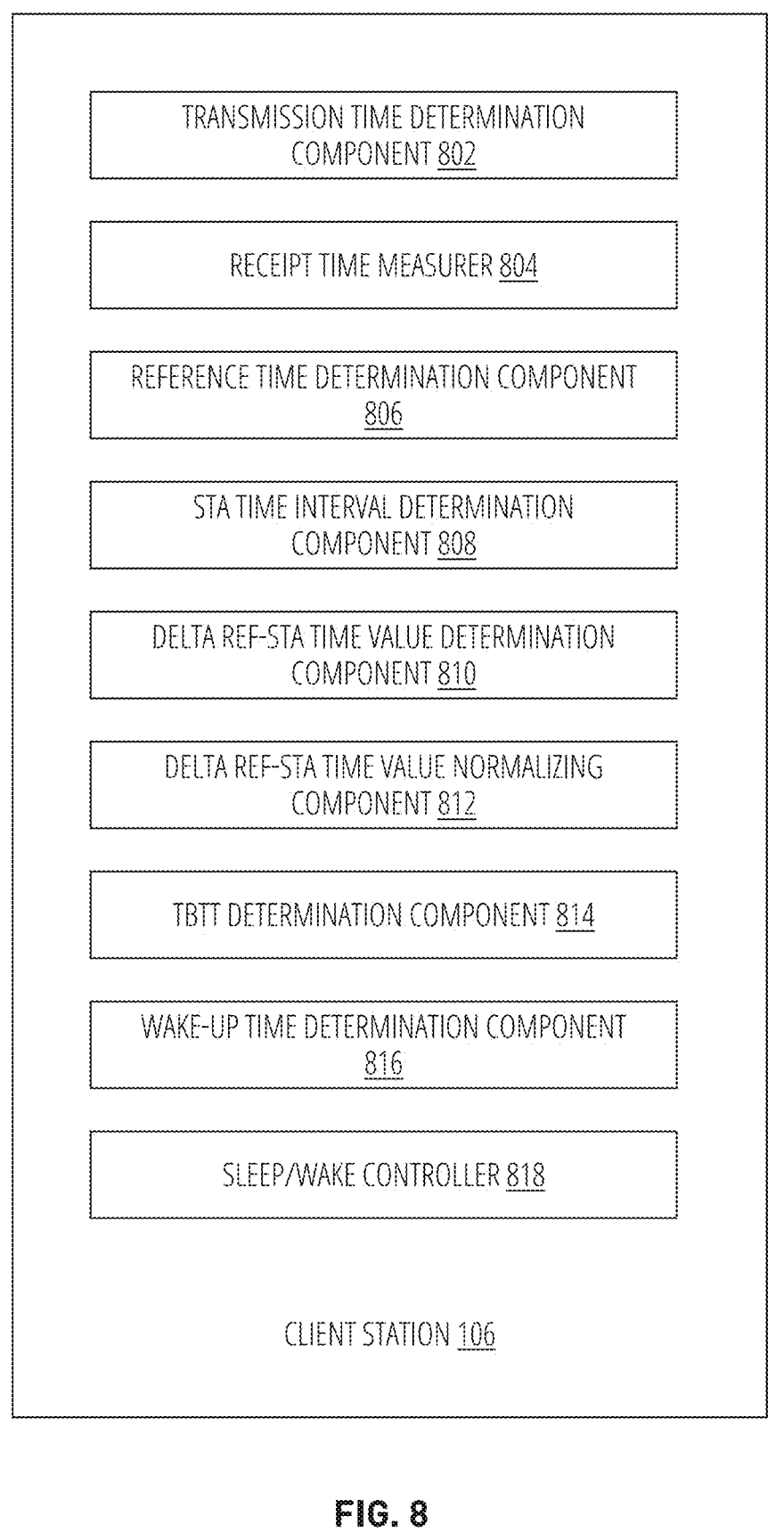

TRANSMISSION TIME DETERMINATION COMPONENT 802

RECEIPT TIME MEASURER 804

REFERENCE TIME DETERMINATION COMPONENT 806

STA TIME INTERVAL DETERMINATION COMPONENT 808

DELTA REF-STA TIME VALUE DETERMINATION COMPONENT 810

DELTA REF-STA TIME VALUE NORMALIZING COMPONENT 812

TBTT DETERMINATION COMPONENT 814

WAKE-UP TIME DETERMINATION COMPONENT 816

SLEEP/WAKE CONTROLLER 818

CLIENT STATION 106

FIG. 8

SYSTEM AND METHOD FOR IMPROVING SUCCESS RATE OF BEACON FRAME RECEPTION IN WIRELESS NETWORKS

CROSS-REFERENCE TO RELATED APPLICATIONS

This application claims priority to and incorporates by reference Chinese application no. 202410518874. X filed 26 Apr. 2024.

TECHNICAL FIELD

The technical field of the present disclosure generally relates to wireless communications, and more specifically, a system and method for improving success rate of beacon frame reception in a wireless network.

BACKGROUND

This disclosure relates generally to wireless communication systems, and more particularly a wireless network (e.g. WLAN). In a wireless network, an access point periodically broadcasts beacon frames to announce the presence of the network and allow client devices to connect and stay connected. To conserve battery power, battery-powered client devices like phones and laptops usually enter a power-saving mode in between data transmissions.

BRIEF SUMMARY

The method for improving success rate of beacon frame reception involves using one or more processors of a client station (STA) to determine a reference time interval based on a difference between a second transmission time of a second beacon frame and a first transmission time of a first beacon frame, determine an STA time interval based on a difference between a second receipt time of the second beacon frame and a first receipt time of the first beacon frame, determine a delta REF-STA time value based on the determined reference time interval and the determined STA time interval, determine a normalized delta REF-STA time value based on the delta REF-STA time value, a predetermined beacon interval, and the reference time interval, determine a target beacon transmission time (TBTT) of a subsequent beacon frame based on a transmission time of a current beacon frame and a predetermined beacon interval, determine an STA wake-up time based on the TBTT of the subsequent beacon frame and the normalized delta REF-STA time value, and wake the STA from a power-saving mode at the STA wake-up time to prepare for receiving the subsequent beacon frame.

In an embodiment, a STA comprising one or more processors and memory storing instructions that, when executed, configure the STA to perform these steps.

In another embodiment, a non-transitory computer-readable storage medium containing instructions that, when executed by the one or more processors, causes the STA to perform these steps.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 is a flowchart illustrating a method for improving success rate of beacon frame reception, according to some examples.

FIG. 8 is a block diagram illustrating example components of a client station, according to some examples.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. In the examples provided below, time units are described in milliseconds (ms), however, the systems and method are not limited to any particular time units. In some examples, microseconds (μs) may be used instead of ms to obtain more precise time values.

Figure 1:
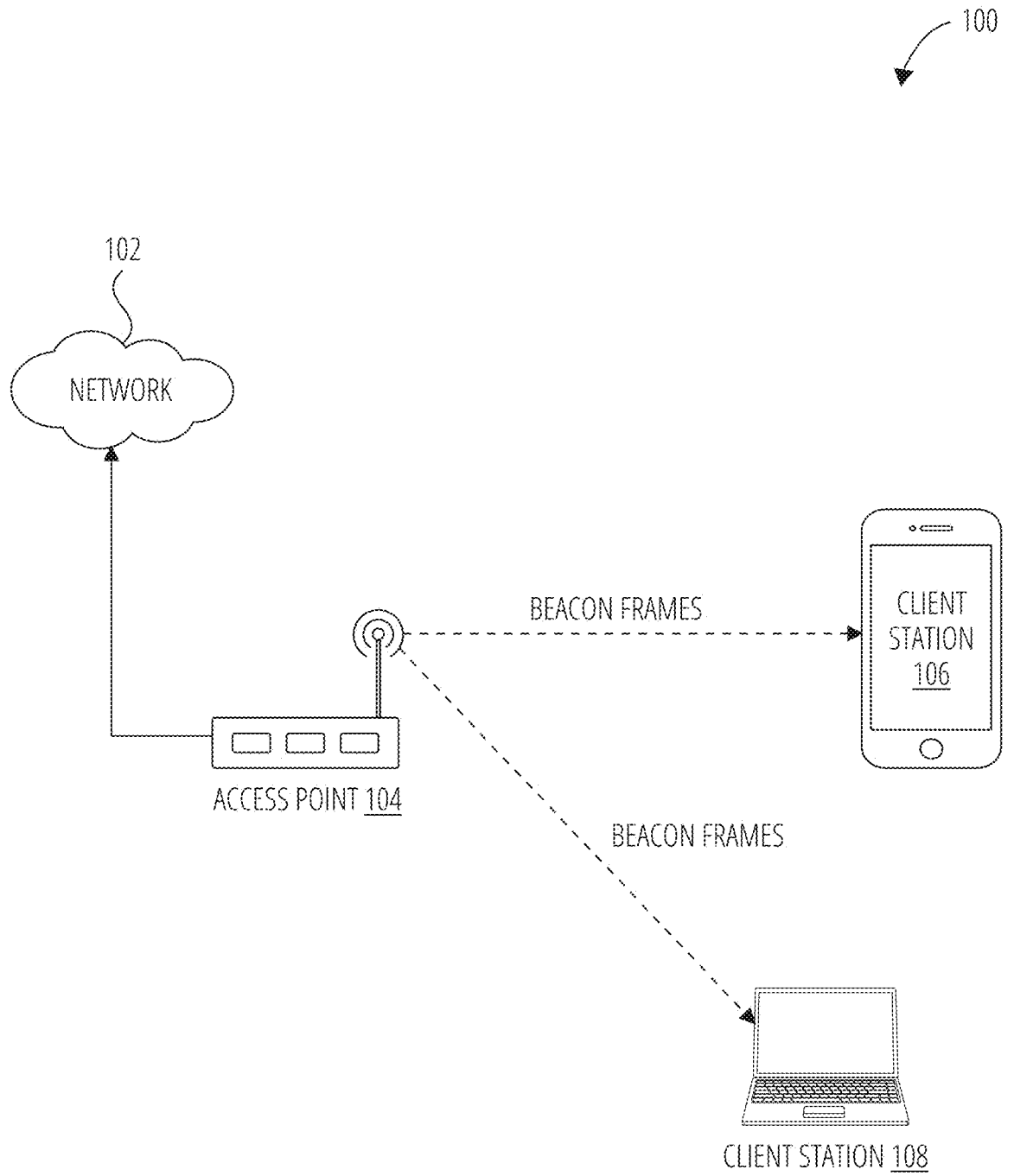
FIG. 1 is a schematic diagram illustrating a network environment, according to some examples.

FIG. 1 is a schematic diagram illustrating a network environment 100, according to some examples.

Network environment 100 includes a network 102, an access point 104, a client station 106, and client station 108. Network environment 100 represents a configuration of devices and connections within a wireless communication environment.

Access point 104 is connected to network 102, serving as an intermediary between network 102 and wireless devices, such as client station 106 and client station 108. Client station 106 can be included in a device like a smartphone or a laptop. Client station 106 wirelessly connects to network 102 through access point 104. This connection enables client station 106 to access network resources, communicate with other devices, and exchange data. In some examples, a client station 106 may act as an access point 104 from the prospective of client station 108.

Figure 2:
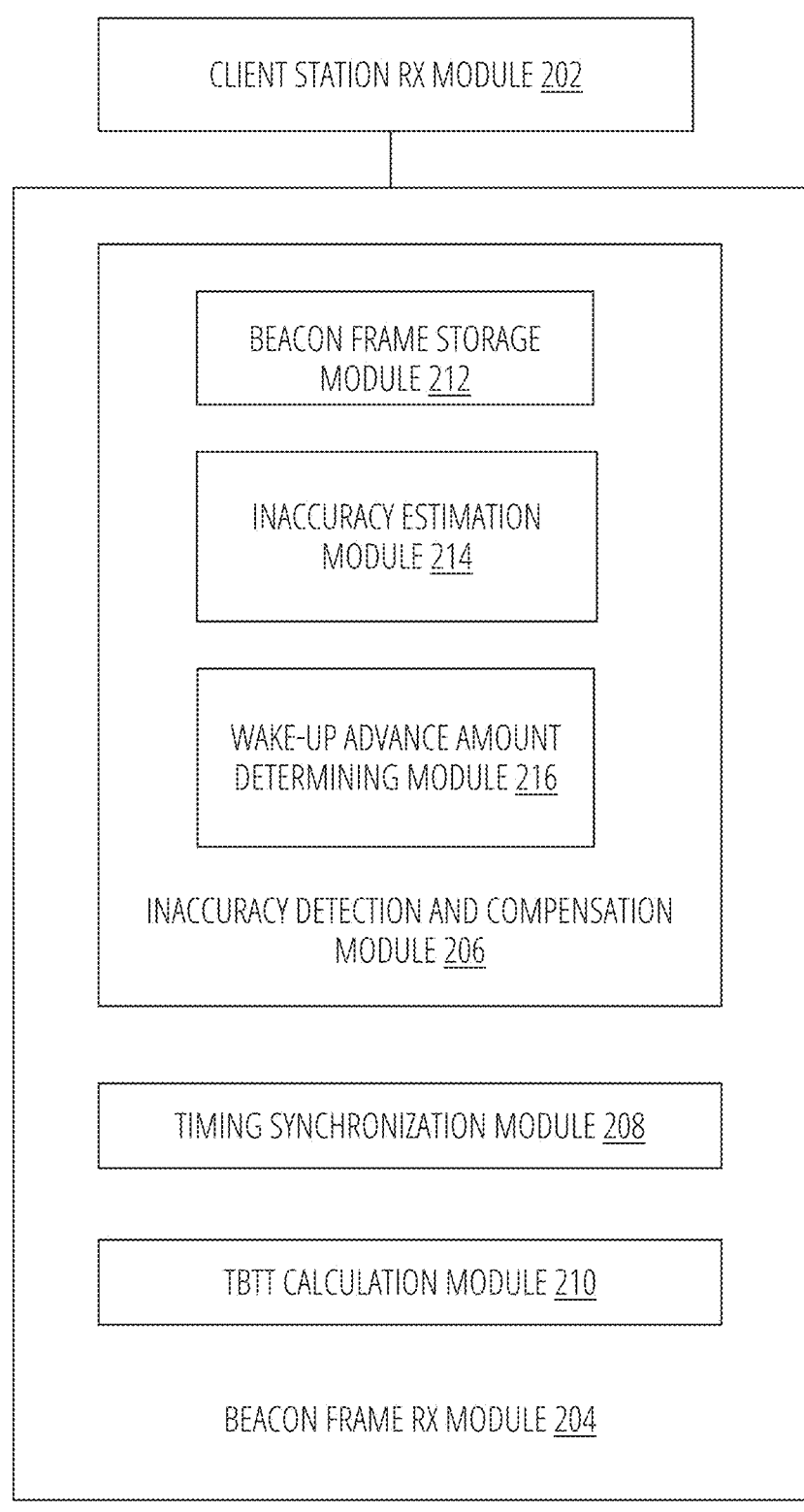
FIG. 2 is a block diagram illustrating example modules of a client station, according to some examples.

FIG. 2 is a block diagram illustrating example modules of a client station (STA), according to some examples.

Client station 106 includes a client station RX module 202, a beacon frame RX module 204, an inaccuracy detection and compensation module 206, a timing synchronization module 208, and a TBTT calculation module 210. The inaccuracy detection and compensation module 206 includes a beacon frame storage module 212, an inaccuracy estimation module 214, and a wake-up advance amount determining module 216.

Client station RX module 202 handles receiving and processing wireless signals at client station 106. In some examples, wireless signals include beacon frames broadcasted from the access point (AP).

Beacon frame RX module 204 processes received beacon frames, extracting the timestamps (e.g., the Timing Synchronization Function (TSF) values) from the beacon frame received, thereby determining the time of transmission of the received beacon frame. In some examples, the transmission time of the beacon frame is measured at the point when a TSF field of the beacon frame is transmitted to the air interface.

Inaccuracy detection and compensation module 206 includes sub-modules for estimating the inaccuracy in an AP's clock and determining a wake-up advance amount in order to compensate for the estimated inaccuracy in the AP's clock and preparation time for other hardware components (e.g., antennas).

Beacon frame storage module 212 stores beacon frames received by the beacon frame RX module 204 for analysis by other modules.

Inaccuracy estimation module 214 estimates the inaccuracy in the AP's clock based on STA time intervals and AP time intervals.

Wake-up advance amount determining module 216 may use the estimated AP's clock's inaccuracy to determine a wake-up advance amount comprising an offset to the inaccuracy in the AP's clock (e.g., an optimal normalized delta STA-AP time value and an optimal delta STA-AP time value) and preparation time required by other hardware. Client station 106 may enter a power-saving mode in between receiving signal transmissions and wake up from the power-saving mode at an optimal time ahead of a transmission time of a subsequent beacon frame, thereby saving power and improving success rate of beacon frame reception.

Timing synchronization module 208 aligns a client station's clock ("STA's clock") with the AP's clock based on the TSF values derived from the beacon frames.

TBTT calculation module 210 calculates target beacon transmission times (TBTTs) based on a predetermined beacon interval and the receipt time of the current beacon frame, so client station 106 knows when to expect the subsequent beacon frame.

Figure 3:
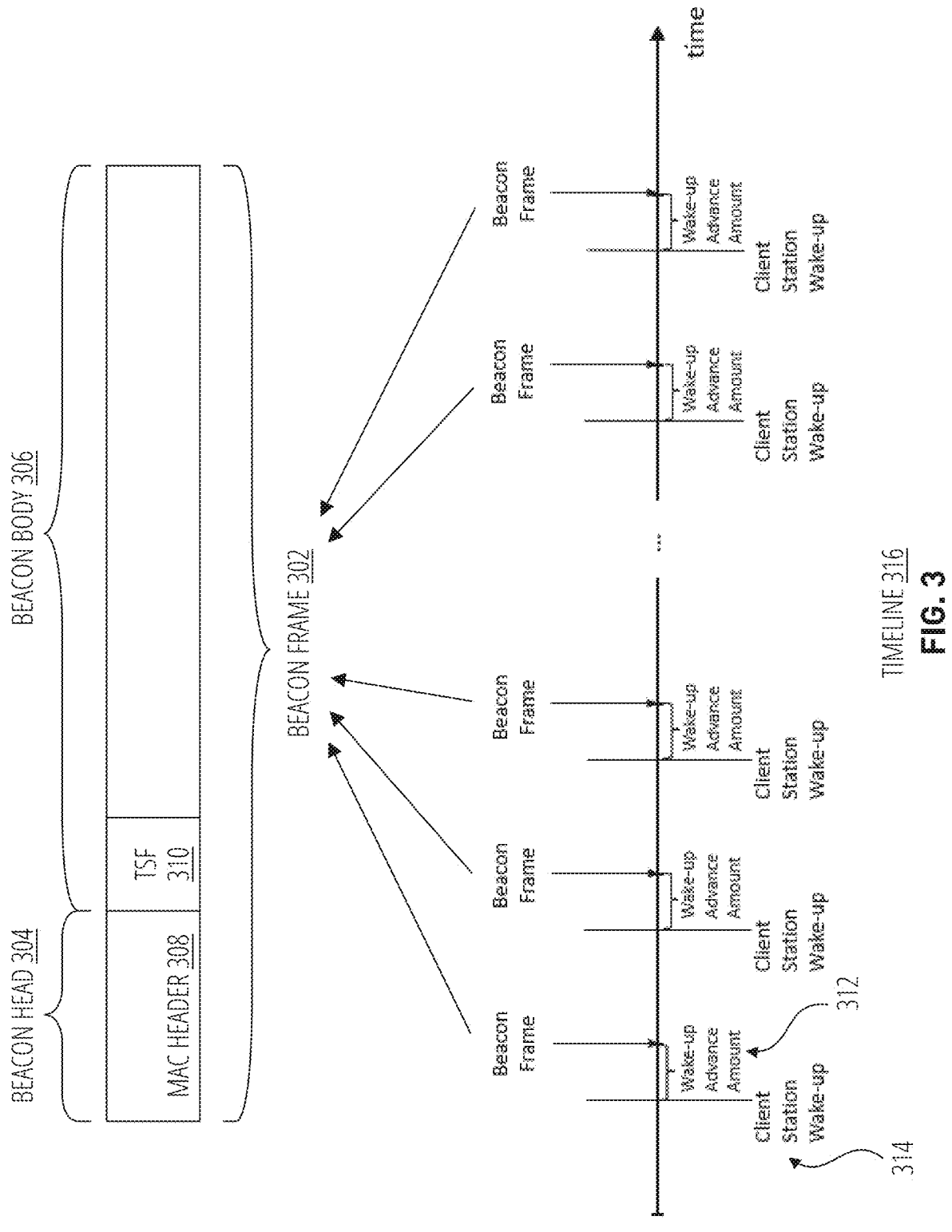
FIG. 3 is a conceptual diagram illustrating components of an example beacon frame and a timeline illustrating beacon frame transmissions from an access point and the client station wake-up times for receiving the beacon frames, according to some examples.

FIG. 3 is a conceptual diagram illustrating components of an example beacon frame and a timeline illustrating beacon frame transmissions from an access point and the STA wake-up times for receiving the beacon frames, according to some examples.

A timeline 316 illustrates the cycles in which beacon frames 302 are transmitted from access point 104 to client station 106 and the timing of client station 106 waking up to receive the beacon frames 302.

Beacon frame 302 includes a beacon head 304 and a beacon body 306.

Beacon head 304 is a first section of a beacon frame. In some examples, beacon head 304 is the first 24 bytes of the beacon frame. In some examples, beacon head 304 includes a media address control (MAC) Header 308. MAC Header 308 indicates a type of frame it is. In some examples, MAC Header 308 indicates that the frame transmitted is a beacon frame 302.

Beacon body 306 includes other information carried by beacon frame 302. In some examples, beacon body 306 includes a timing synchronization function (TSF) 310. TSF 310 is a counter that indicates a length of time since the AP has powered on. In other words, TSF 310 may be a timestamp indicating when the beacon frame is being transmitted according to the AP's clock. The TSF 310 may be included in a TSF field. In a specific example, TSF 310 indicates the timestamp in microseconds (us) when the first bit of the TSF field of the beacon frame was transmitted to an air interface.

Timeline 316 illustrates periodic transmissions of beacon frames from the access point 104 to client station 106, wake-up advance amounts 312 of client station 106, and the timing of client station 106 wakes up from power-saving mode before each beacon frame 302 according to a wake-up advance amount 312. After receiving the beacon frame, client station 106 may go back to power-saving mode (i.e., sleep) until client station 106 wakes up in a next cycle.

Wake-up advance amount 312 is an amount of time before a beacon frame 302 is expected to be transmitted that client station 106 wakes up from the power-saving mode. If wake-up advance amount 312 is too large, client station 106 may wake up earlier than necessary, wasting energy; however, if wake-up advance amount 312 is too small, client station 106 may wake up too late and miss beacon frame 302. Wake-up advance amount 312 may account for one or more factors. In some examples, wake-up advance amount 312 accounts for time required for hardware components to prepare for receiving data (e.g., powering on beacon frame RX Module 204) and a buffer for any inaccuracy in the AP's clock. In a specific example, wake-up advance amount 312 is 2 ms, and the subsequent beacon frame is expected to be transmitted at 302.4 ms, client station 106 wakes up from power-saving mode at 300.4 ms.

Figure 4:
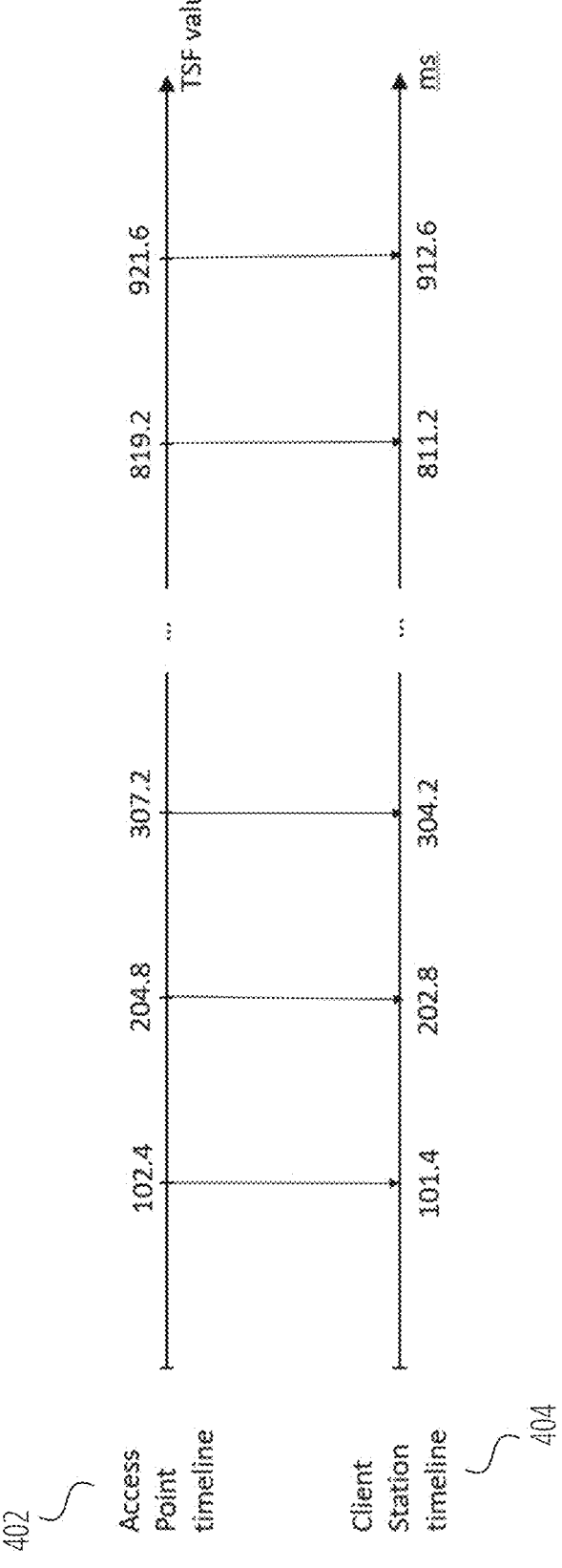
FIG. 4 is a conceptual diagram showing two timelines illustrating example timings for transmitting beacon frames from an access point to a client station, according to some examples.

FIG. 4 is a conceptual diagram showing two timelines illustrating example timings for transmitting beacon frames from an access point to a client station, according to some examples.

Access point timeline 402 marks the points in time when a beacon frame is sent according to the AP's clock. The client station timeline marks the points in time when a beacon frame is received from the access point according to the STA's clock. For simplicity's sake, it is assumed that both access point timeline 402 and client station timeline 404 begin at 0 ms. In real-world scenarios, the clocks of the access point and the client station might start at any given time.

The access point 104 broadcasts beacon frames (e.g., beacon frame 302) according to target beacon transmission times ("TBTTs"). A TBTT indicates the time at which beacon frames are scheduled to be broadcasted or transmitted. In some examples, the TBTTs may be predetermined. For example, the TBTTs=(N+1)×a predetermined beacon interval (N is a cycle number corresponding to the beacon frame). In the example illustrated in FIG. 4, the TBTTs are 102.4, 204.8, 307.2, . . . , 819.2, and 921.6 milliseconds (ms), that is, a beacon frame is scheduled to be transmitted every 102.4 ms. Alternatively, the TBTTs may be calculated by the STA in real time based on the receipt time of the current beacon frame or preceding beacon frame. For examples, client station 106 may determine the current cycle number by performing a floor division of the TSF value of the current beacon frame by the predetermined beacon interval. For example: $\lfloor 110.0/102.4 \rfloor = 1$, wherein 110.0 is the TSF value of the current beacon frame and 102.4 is the predetermined beacon interval, and 1 indicates that the current cycle number is the first cycle. The TBTT of the subsequent beacon frame would be (the current cycle number+1)×the predetermined beacon interval. For example: (1+1)×102.4=204.8 ms, which is the TBTT of the subsequent beacon frame.

The access point 104 uses an AP's clock to keep track of the TBTTs. The AP's clock may be a counter that starts counting in response to the access point 104's power on. The access point 104 broadcasts or transmits a beacon frame 302 in response to the AP's clock reaches a TBTT. In this example illustrated in FIG. 4, the access point 104 transmits a beacon frame 302 to client station when the AP's clock reaches 102.4, 204.8, 307.2, . . . , 819.2, and 921.6 ms. In some examples, due to inaccuracy in the AP's clock, the actual times when each beacon frame is transmitted may be different from the TBTTs in a way that may be earlier or later than the TBTTs. For example, the access point 104 transmits a beacon frame 302 in response to the AP's clock reaching 102.4 ms, but in absolute time, the beacon frame 302 was transmitted at 101.4 ms.

Client station 106 receives each beacon frame from the access point 104 and determine the receipt time of each beacon frame according to the STA's clock. The STA's clock may be presumed to track the absolute time. In the example illustrated in FIG. 4, due to inaccuracy of the AP's clock (AP's clock runs faster than absolute time), the access point 104 transmits beacon frames 302 not at target beacon transmission times ("TBTTs"), but at a slightly earlier times, specifically, at 101.4, 202.8, 304.2, . . . , 811.2, and 912.6 ms.

Optionally, at 0 ms, the access point 104 and the AP's clock are powered on. At 0 ms, a beacon frame 302 may be broadcasted, and then subsequently, a second beacon frame is broadcasted at 102.4 ms. Alternatively, the access point 104 does not broadcast any beacon frame upon startup. Instead, the access point 104 broadcasts the first beacon frame at a multiple of the predetermined beacon interval after startup (e.g., 102.4 ms or 204.8 ms).

Client station 106 determines an estimation of the AP's clock's inaccuracy based on a difference between a length of the STA time interval and a length of the AP time interval (i.e., the length of the STA time interval–the length of the AP time interval).

The length of the AP time interval may be determined by calculating a time interval between transmission of two beacon frames, that is, taking the difference between a second TSF value and a first TSF value (e.g., second TSF value–first TSF value). In some examples, the first TSF value relates to the time at which a preceding beacon frame was transmitted, and the second TSF value relates to the time at which a current beacon frame is transmitted. The preceding beacon frame was transmitted before the current beacon frame. For example, the first TSF value is 102.4 ms and the second TSF value is 204.8 ms. The length of the AP time interval is 204.8–102.4=102.4 ms.

The length of STA time interval may be determined by calculating the differences between receipt times of two beacon frames (i.e., a second receipt time–a first receipt time). The first receipt time may be the time at which the preceding beacon frame was received by client station 106, and the second receipt time may be the time at which the current beacon frame is received by client station 106. In some examples, the preceding beacon frame and the current beacon frame are received consecutively. For example, the first receipt time is 101.4 ms and the second receipt time is 202.8 ms; in other words, the preceding beacon frame was received at 101.4 ms according to STA's clock and the current beacon frame was received at 202.8 ms according to STA's clock. The length of the STA time interval is 202.8–101.4=101.4 ms. In some examples, if the TSF values used to calculate the length of the AP time value represent the time when the TSF fields are transmitted to the air interface, then the receipt times used to calculate the length of the STA timeline need to represent the time when the TSF fields are received by client station 106, ensuring that both time measurements are made using the same reference (e.g., TSF field).

In some examples, the method for determining the lengths of the AP time interval and STA time interval applies to non-consecutive beacon frames. For instance, the length of the STA time interval could be calculated based on the receipt times of the first received beacon frame and the fourth received beacon frame, skipping the second and third beacon frames in between. Similarly, the length of the AP time interval may be determined based on the TSF values of the first beacon frame and the fourth beacon frame. In essence, the method described herein can flexibly utilize non-successive beacon frames to establish the timing intervals as long as the intervals are based on the same set of beacon frames and same set of reference points (e.g., TSF fields of the same set of beacon frames).

Client station 106 determines a delta STA-AP time value based on the difference between the length of the STA time interval and the length of the AP time interval (e.g., delta STA-AP time value=the length of the STA time interval–the length of the AP time interval). For example, the delta STA-AP time value is 101.4 ms–102.4 ms=–1 ms. The delta STA-AP time value may be an estimated inaccuracy in the AP's clock. This process can be repeated across multiple beacon frames to determine an optimal delta STA-AP time value. Client station 106 may use the optimal delta STA-AP time value to determine the optimal wake-up advance amount that allows client station 106 to exit power-saving mode early enough to reliably receive beacon frames from the access point while maximizing time spent in the power-saving mode by not waking up earlier than necessary.

In the example illustrated in FIG. 4, client stations 106 may determine that an additional AP time interval is 102.4 ms (i.e., 307.2 ms–204.8 ms), and an additional STA time interval is 101.4 (i.e., 304.2 ms–202.8 ms). Therefore, the additional delta STA-AP time value is –1 ms (i.e., 101.4 ms–102.4 ms=–1 ms).

After repeating the process of determining one or more delta STA-AP time values, thereby obtaining multiple delta STA-AP time values, client station 106 may select an optimal delta STA-AP time value among the multiple delta STA-AP time values. In some examples, the optimal delta STA-AP time value is a minimum value among the multiple delta STA-AP time values if the multiple delta STA-AP time values comprise at least one negative number because a negative delta STA-AP time value indicates that the STA time interval is shorter than the AP time interval, meaning that the AP's clock runs faster than the STA's clock. To account for this inaccuracy, client station 106 uses the maximum negative number (i.e., minimum value) as an offset. This ensures client station 106 to wake early enough to receive the beacon frames even for large inaccuracies in the AP's clock. In some examples, the client station 106 selects a minimum value among the multiple delta STA-AP time values as the optimal delta STA-AP time value.

Figure 5:
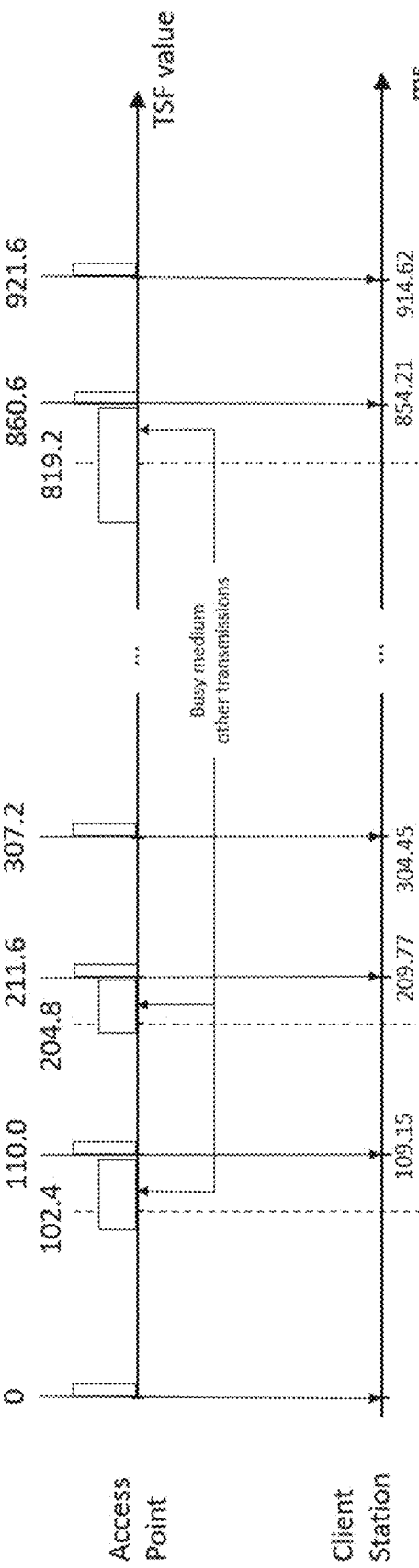
FIG. 5 is a conceptual diagram showing two timelines illustrating example timings for transmitting beacon frames from an access point to a client station with network traffic, according to some examples.

FIG. 5 is a conceptual diagram showing two timelines illustrating example timings for transmitting beacon frames from an access point to a client station with network traffic, according to some examples.

The access point 104 tries to broadcast beacon frames 302 according to the TBTTs. However, in some examples, due to Internet traffic, the access point 104 is not able to broadcast the beacon frames 302 at a scheduled time (e.g., TBTT), and the access point 104 has to wait until an air interface (e.g., radio interface, wireless medium, radio frequency interface, radio communication interface) is idle before sending, thereby waiting some time after the TBTT. Therefore, the lengths of the intervals between each transmission are different and the inaccuracy in AP's clock would contribute differently to each interval. There is a need to normalize the intervals based on the length of each interval.

In an example illustrated in FIG. 5, the access point 104 tries to broadcast a first beacon frame at 102.4 ms, but due to either busy medium or other transmissions, the access point 104 is not able to broadcast the first beacon frame at 102.4 ms, instead, the access point 104 waits until 110.0 ms to broadcast the first beacon frame. Due to the inaccuracies in the AP's clock, even though the first beacon frame received by client station 106 indicates that the first beacon frame is sent at 110.0 ms according to the first TSF value derived from the TSF 310 included in the first beacon frame, client station 106 received the first beacon frame at 109.15 ms according to the STA's clock. Client station 106 determines that the first TSF value is 110.0 ms, and the first receipt time is 109.15 ms.

In this example, in a second interval, the access point 104 tries to broadcast a second beacon frame according to the TBTTs; however, due to Internet traffic again, the access point 104 is not able to broadcast the second beacon frame at a TBTT (i.e., 204.8 ms), instead, it waits until 211.6 ms to broadcast the second beacon frame after the traffic has cleared out. A second TSF value derived from the TSF 310 included in the second beacon frame indicates that the second beacon frame is sent at 211.6 ms, but client station 106 receives the second beacon frame at 209.77 ms, according to the STA's clock. Client station 106 determines that the second TSF value is 211.6 ms, and the second receipt time is 209.77 ms.

Client station 106 may calculate the AP time interval based on the first TSF value and the second TSF value (e.g., first AP time interval=second TSF value−first TSF value=211.6 ms−110.0 ms=101.6 ms). Client station 106 may also calculate the STA time interval based on the first receipt time and the second receipt time (e.g., first STA time interval=second receipt time−first receipt time=209.77 ms−109.15 ms=100.62 ms). Client station 106 may further calculate a delta STA-AP time value based on the AP time interval and the STA time interval (e.g., first delta STA-AP time value=first STA time interval−first AP time interval=100.62 ms−101.6 ms=−0.98 ms).

In the third interval, the access point 104 tries to broadcast a third beacon frame according to the TBTTs. Because the Internet traffic is clear, the access point 104 manages to broadcast the third beacon frame at the TBTT (i.e., 307.2 ms). A third TSF value derived from the TSF 310 of the third beacon frame indicates that the third beacon frame is sent at 307.2 ms, but client station 106 receives the third beacon frame at 304.45 ms, according to the STA's clock (i.e., the third receipt time is 304.45 ms).

Client station 106 may calculate a second AP time interval based on the second TSF value and the third TSF value (i.e., second AP time interval=third TSF value−second TSF value=307.2 ms−211.6 ms=95.6 ms). Client station 106 may also calculate a second STA time interval based on the second receipt time and the third receipt time (e.g., second STA time interval=third receipt time−second receipt time=304.45 ms−209.77 ms=94.68 ms). Client station 106 may further calculate a second delta STA-AP time value based on the second AP time interval and the second STA time interval (e.g., second delta STA-AP time value=second STA time interval−second AP time interval=94.68 ms−95.6 ms=−0.92 ms).

The fourth, fifth, sixth, and seventh intervals are omitted in FIG. 5 for brevity.

In the eighth interval, the access point 104 tries to broadcast an eighth beacon frame according to the TBTTs; however, due to Internet traffic again, the access point 104 is unable to broadcast the eighth beacon frame at a TBTT (i.e., 819.2 ms), instead, it waits until 860.6 ms to broadcast the eighth beacon frame after the other transmission is completed. A transmission time of the eighth beacon frame (i.e., 860.0 ms) may be derived from the TSF 310 of the eighth beacon frame, but client station 106 receives the eighth beacon frame at 854.21 ms, according to the STA's clock.

In the ninth interval, the access point 104 tries to broadcast a ninth beacon frame according to the TBTTs. Because the window is clear, the access point 104 manages to broadcast the ninth beacon frame at the TBTT (i.e., 921.6 ms). A transmission time of the ninth beacon frame (i.e., 921.6 ms) maybe derived from a TSF 310 included in the ninth beacon frame, but client station 106 receives the ninth beacon frame at 914.62 ms, according to the STA's clock.

Client station 106 may calculate an eighth AP time interval based on the ninth TSF value and the eighth TSF value (i.e., eighth AP time interval=ninth TSF value−eighth TSF value=921.6 ms−860.6 ms=61 ms). Client station 106 may also calculate an eighth STA time interval based on the ninth receipt time and the eighth receipt time (e.g., eighth STA time interval=ninth receipt time−eighth receipt time=914.62 ms−854.21 ms=60.41 ms). Client station 106 may further calculate an eighth delta STA-AP time value based on the eighth AP time interval and the eighth STA time interval (e.g., eighth delta STA-AP time value =eighth STA time interval-eighth AP time interval=60.41 ms−61 ms=−0.59 ms).

After repeating the process of determining one or more delta STA-AP time values (e.g., first delta STA-AP time value, second delta STA-AP time value, eighth delta STA-AP time value, etc), client station 106 may select an optimal delta STA-AP time value among the one or more delta STA-AP time values. In some examples, client station 106 selects a minimum value among the one or more delta STA-AP time values as the optimal delta STA-AP time value. In some examples, the one or more delta STA-AP time values comprising at least one negative number, the optimal delta STA-AP time value is the minimum value among the one or more delta STA-AP time values. For example, among three delta STA-AP time values that are −0.98 ms, −0.92 ms, −0.59 ms. The optimal delta STA-AP time value would be −0.98 ms based on at least one of the delta STA-AP time values being negative and −0.98 ms is the minimum value of the three delta STA-AP time values. We select the minimum value because that would create the largest buffer for client station 106 to wake up from sleep, making sure that client station 106 won't miss any beacon frame. In some examples, the one or more delta STA-AP time values contain only non-negative values (i.e., a positive number or zero), the optimal delta STA-AP time value is 0 ms because a positive delta STA-AP time value indicates that the AP's clock runs slower than the STA's clock, therefore, there is no need to wake up early to account for the inaccuracy in the AP's clock. However, client station 106 may still need to wake up early to create a buffer for time required for other hardware components' preparation. In other words, the component that accounts for inaccuracy in the AP's clock is zero in these examples, but the wake-up advance amount may or may not be zero. Alternatively, the client station 106 selects one of the values from the one or more delta STA-AP time values as the optimal delta STA-AP time values.

Client station 106 may determine a normalized delta STA-AP time value for each delta STA-AP time value determined in order to account for variances in the length of time intervals between beacon frame transmissions. As illustrated in FIG. 5, the intervals between beacon frame transmissions may vary due to factors like network traffic, causing the amount of inaccuracy contributed by the inaccuracy in the AP's clock to vary for each interval. In some examples, the normalization process is performed in response to determining each delta STA-AP time value. The normalization process includes finding a ratio between a predetermined beacon interval and the length of time between two beacon frames being evaluated (e.g. the STA time value, AP time value), then using that ratio to multiply by the inaccuracy (e.g. the delta STA-AP time value). For example, a normalized delta STA-AP time value may be determined by multiplying a delta STA-AP time value with a ratio of predetermined beacon interval and the STA time interval (i.e., normalized delta STA-AP time value =delta STA-AP time value x predetermined beacon interval/STA time interval). This is determined under the assumption of STA time interval is the time elapsed between the transmissions of two beacon frames under absolute time.

For the example illustrated in FIG. 5, the second delta STA-AP time value is –0.92 ms. The normalized second delta STA-AP time value is equal to second delta STA-AP time value x predetermined beacon interval/second STA time interval (i.e., –0.92 ms×102.4 ms/94.68 ms≈–0.995 ms).

In some examples, client station 106 determines the normalized delta STA-AP time value in response to determining the delta STA-AP time value. After repeating the process of determining one or more normalized delta STA-AP time values (e.g., normalized first delta STA-AP time value, normalized second delta STA-AP time value, normalized eighth delta STA-AP time value, etc), client station 106 may select an optimal normalized delta STA-AP time value among the one or more normalized delta STA-AP time values. In some examples, client station 106 selects a minimum value among the one or more normalized delta STA-AP time values as the optimal normalized delta STA-AP time value. In some examples, the one or more normalized delta STA-AP time values comprise at least one negative number, the optimal normalized delta STA-AP time value is the minimum value among the one or more normalized delta STA-AP time values. For example, among three normalized delta STA-AP time values are –0.9973 ms, –0.995 ms, –1 ms. The optimal delta STA-AP time value would be –1 ms based on at least one delta STA-AP time value being negative and –1 ms is the minimum value of the three normalized delta STA-AP time values. We select the minimum value because that would create the largest buffer for client station 106 to wake up from sleep, making sure that client station 106 won't miss any beacon frame. In some examples, the normalized delta STA-AP time values contain only non-negative values, the optimal normalized delta STA-AP time value is 0 ms because a positive normalized delta STA-AP time value indicates that the AP's clock runs slower than the STA's clock, therefore, there is no need to wake up early to account for the inaccuracy in the AP's clock. However, client station 106 may still need to wake up early to create a buffer for time required for other hardware components' preparation. In other words, the component that accounts for inaccuracy in the AP's clock is zero in these examples, but the wake-up advance amount may or may not be zero. Alternatively, the client station 106 selects one of the values from the one or more normalized delta STA-AP time values as the optimal normalized delta STA-AP time value.

Client station 106 may predict a next receipt time in response to receiving a beacon frame. In some examples, after client station 106 selects the optimal normalized delta STA-AP time value as an estimated clock inaccuracy value for the AP's clock (e.g. –1 ms per predetermined beacon interval of 102.4 ms), client station 106 predicts the timing of the subsequent beacon frame as follows: client station 106 synchronizes its clock based on the TSF value of the last received beacon frame (e.g., current beacon frame). For example, if a TSF value of the last received beacon frame is 110.0 ms, client station 106 sets STA's clock to 110.0 ms. In another example, client station 106 may synchronize its clock with a slight adjustment to the TSF value to account for the time elapsed for receiving the entire TSF field. For instance, if the TSF value of the current beacon frame is 110.0 ms, and acknowledging that the TSF value corresponds to the time when the beacon head of the current beacon frame was received, client station 106 compensates for the time taken to receive the whole TSF field, which may be approximately 64 microseconds (µs). Therefore, client station 106 optionally sets the STA's clock to 110.064 ms. In response to setting the STA's clock, client station 106 calculates a current cycle number corresponding to the beacon frame received by performing a floor division of the TSF value of the current beacon frame by the predetermined beacon interval. For example: [110.0/102.4]=1. Client station 106 calculates the target beacon transmission time (TBTT) of the subsequent beacon frame by multiplying a next beacon cycle number (i.e., the current cycle number +1) by the predetermined beacon interval. For example: (1+1)× 102.4=204.8 ms. This is the TBTT of a subsequent beacon frame. Client station 106 calculates the next receipt time by taking inaccuracy in AP's clock into account. For the example illustrated in FIG. 5, a next receipt time after the second beacon frame is calculated as follows: 204.8 ms+(–1 ms)×(204.8 ms–110.0 ms)/102.4 ms≈203.9 ms. This is the next receipt time after taking inaccuracy in AP's clock into account. The client station 106 may determine the wake-up advance amount based on the next receipt time and other time required for hardware components to prepare for receiving the subsequent beacon frame.

In some examples, client station 106 synchronizes its clock to the timestamp of the last received beacon frame is optional (i.e., client station 106 does not need to synchronize the STA's clock with the AP's clock). In these examples, client station 106 calculates the next receipt time as follows: TBTT–TSF value of the current beacon frame+receipt time of the current beacon frame+estimated clock inaccuracy value×(TBTT–TSF value)/the predetermined beacon interval). For example, TBTT is 204.8 ms, the TSF value of the current beacon frame is 110.0 ms, and the receipt time of the current beacon frame is 109.15 ms. The next receipt time of the subsequent beacon frame is: 204.8–110.0+109.15+(–1)×

(204.8−110.0)/102.4 ms≈203.02 ms. The client station 106 may determine the wake-up advance amount based on the next receipt time and other time required for hardware components to prepare for receiving the subsequent beacon frame.

FIG. 6 is a flowchart illustrating method 600 for improving success rate of beacon frame reception, according to some examples.

The method 600 may be embodied in computer-readable instructions for execution by one or more processors such that operations of the method 600 may be performed in part or in whole by the functional components of client station 106; accordingly, the method 600 is described below by way of example with reference thereto. However, it shall be appreciated that at least some of the operations of the method 600 may be deployed on various other hardware configurations than client station 106. Note that the description of operations of the method 600 below may represent only one iterative cycle and multiple cycles may be executed.

In operation 602, client station 106 receives a first beacon frame from the access point. The first beacon frame contains a first TSF value according to the AP's clock. Client station 106 may derive a timestamp corresponding to a transmission time of the first beacon frame from the first TSF value.

In operation 604, client station 106 measures the first receipt time of the first beacon frame according to client station 106's own clock (e.g., STA's clock). The STA's clock is presumed to track absolute time. In some examples, the first receipt time is measured in response to receiving the TSF field of the first beacon frame. In some other examples, the first receipt time is measured in response to receiving a first bit of the beacon head (e.g., beacon head 304) of the first beacon frame. The relationship between the time of receiving the first bit of the beacon head and that of receiving the first bit of the TSF field is as follows: if the transmission rate of the beacon frame is 1 Mbps, with the beacon head being 24 bytes, or 192 bits, the time it will take to transmit the beacon head is 0.192 ms. This means that if the time of receiving a beacon head is 110.0 ms, then the time of receiving the TSF field would be 110.192 ms.

In operation 606, client station 106 receives a second beacon frame from the access point. The second beacon frame contains a second TSF value according to the AP's clock. Client station 106 may derive a timestamp corresponding to a transmission time of the second beacon frame based on the second TSF value.

In operation 608, client station 106 measures the receipt time of the second beacon frame according to client station 106's own clock (e.g., STA's clock). In some examples, the second receipt time is measured in response to receiving the TSF field of the second beacon frame. In some other examples, the second receipt time is measured in response to receiving a first bit of the beacon head (e.g., beacon head 304) of the second beacon frame.

In operation 610, client station 106 determines a first AP time interval based on the difference between the second TSF value and the first TSF value from the access point. This calculates the length of time between the transmissions of the two beacon frames from the AP's perspective, which may differ from the absolute time elapsed.

In operation 612, client station 106 determines a first STA time interval based on the difference between the second receipt time and the first receipt time according to the STA's clock. This calculates the length of time between the transmission of the two beacon frames according to the STA's clock, which is assumed to align with absolute time, representing a true, precise, and objective measurement of time.

In operation 614, client station 106 determines a first delta STA-AP time value based on the first AP time interval and the first STA time interval. The first delta STA-AP time value represents the difference in measurements of the STA's clock and the AP's clock over the same time interval. In some examples, client station 106 determines a first delta STA-AP time value based on the first and second receipt times and the first and second TSF values.

In operation 616, client station 106 calculates the normalized delta STA-AP time value based on the delta STA-AP time value (e.g., first delta STA-AP time value).

In decision block 618, client station 106 determines whether a number of normalized delta STA-AP time values exceeds a first predetermined number, N (e.g., 3). If no, client station 106 proceeds to performs operation 606, receiving additional beacon frames. However, the additional beacon frame is treated as the second beacon frame and the previous second beacon frame is treated as the first beacon frame in subsequent operations. In repeating operations 606-616, client station 106 may obtain multiple normalized delta STA-AP time values. If the number of normalized delta STA-AP time values exceeds the first predetermined number, N (e.g., 3), the decision block 618 returns yes, and client station 106 proceeds to operation 620.

In operation 620, client station 106 selects the optimal normalized delta client station-access point time value (i.e., optimal normalized delta STA-AP time value) from the multiple values as the estimated clock inaccuracy value for the access point.

In operation 622, client station 106 determines the wake-up advance amount based on the optimal normalized delta STA-AP time value using the method disclosed in the descriptions to FIG. 5.

In operation 624, client station 106 wakes up from the power-saving mode the wake-up advance amount before the transmission time of the subsequent beacon frame to prepare for receiving additional beacon frames. In some examples, client station 106 performs method 600 repeatedly in response to performing operation 624 to further refine the optimal normalized delta STA-AP time value, thereby further improving the estimated clock inaccuracy value. In some examples, client station 106 performs method 600 repeatedly to obtain two or more optimal normalized delta STA-AP time values, and client station 106 selects the minimum value among the two or more optimal normalized delta STA-AP time values as a refined optimal normalized delta STA-AP time value.

In decision block 626, client station 106 determines whether a number of consecutive failures to receive the additional beacon frames exceeds a second predetermined number, M (e.g., 5). If yes, client stations 106 proceeds to operation 602 to restart method 600. If no, client station 106 proceeds to operation 624.

Figure 7:
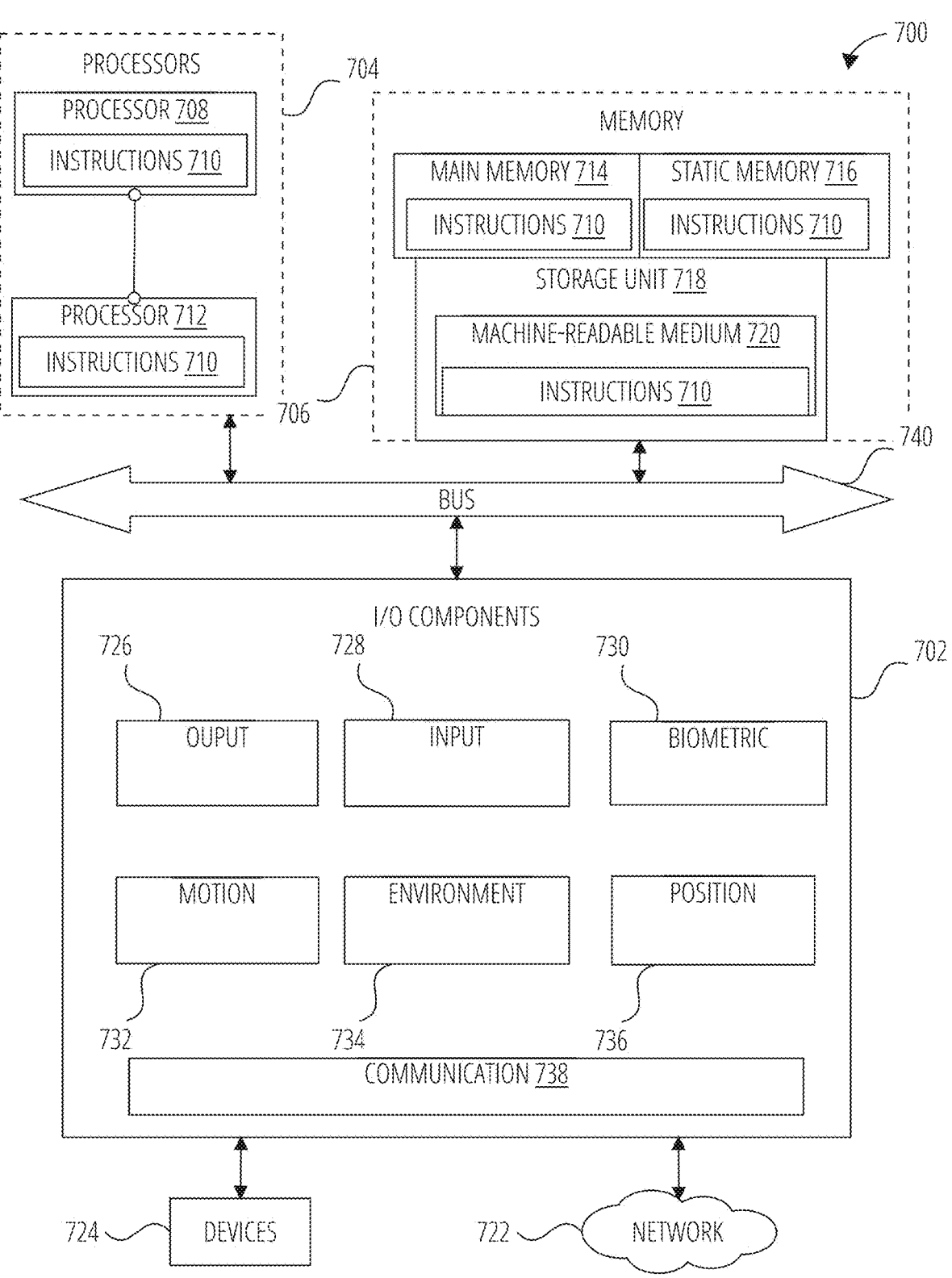
FIG. 7 is a diagrammatic representation of the client station, according to some examples.

FIG. 7 is a diagrammatic representation of client station 700 within which instructions 710 (e.g., software, a program, an application, an applet, an app, or other executable code) for causing client station 700 to perform any one or more of the methodologies discussed herein may be executed. For example, the instructions 710 may cause client station 700 to execute any one or more of the methods described herein. The instructions 710 transform the general, non-programmed client station 700 into a particular client station 700 programmed to carry out the described and illustrated functions in the manner described. Client station 700 may operate as a standalone device or be coupled (e.g., networked) to other machines. In a networked deployment, client station 700 may operate in the capacity of a server machine or a client machine in a server-client network environment, or as a peer machine in a peer-to-peer (or distributed) network environment. Client station 700 may include, but not be limited to, a server computer, a client computer, a personal computer (PC), a tablet computer, a laptop computer, a netbook, a set-top box (STB), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by client station 700. Further, while a single client station 700 is illustrated, the term "machine" may include a collection of machines that individually or jointly execute the instructions 710 to perform any one or more of the methodologies discussed herein.

Client station 700 may include processors 704, memory 706, and I/O components 702, which may be configured to communicate via a bus 740. In some examples, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another Processor, or any suitable combination thereof) may include, for example, a Processor 708 and a Processor 712 that execute the instructions 710. The term "Processor" is intended to include multi-core processors that may include two or more independent processors (sometimes referred to as "cores") that may execute instructions 710 contemporaneously. Although FIG. 7 shows multiple processors 704, client station 700 may include a single processor with a single core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, wholly or partially, within the main memory 714, within the static memory 716, within machine-readable medium 720 within the storage unit 718, within the processors 704 (e.g., within the processor's cache memory), or any suitable combination thereof, during execution thereof by client station 700.

The I/O components 702 may include various components to receive input, provide output, produce output, transmit information, exchange information, or capture measurements. The specific I/O components 702 included in a particular machine depend on the type of machine. For example, portable machines such as mobile phones may include a touch input device or other such input mechanisms, while a headless server machine will likely not include such a touch input device. The I/O components 702 may include many other components not shown in FIG. 7. In various examples, the I/O components 702 may include output components 726 and input components 728. The output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), or other signal generators. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), or identify a person (e.g., voice identification, retinal identification, facial identification, fingerprint identification, or electroencephalogram-based identification). The motion components 732 include acceleration sensor components (e.g., accelerometer), gravitation sensor components, rotation sensor components (e.g., gyroscope). The environmental components 734 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 736 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple client station 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, or location via detecting an NFC beacon signal that may indicate a particular location.

The various memories (e.g., main memory 714, static memory 716, and/or memory of the processors 704) and/or storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

FIG. 8 is a block diagram illustrating example components of a client station, according to some examples. The client station comprises a transmission time determination component 802, a receipt time measurer 804, a reference time determination component 806, an STA time interval determination component 808, a Delta REF-STA time value determination component 810, a Delta REF-STA time value normalizing component 812, a TBTT determination component 814, a wake-up time determination component 816, and a Sleep/Wake controller 818. In some examples, the client station may be a client station 700.

The transmission time determination component 802 determines transmission times of beacon frames based on the TSF values contained in the beacon frames. In some examples, TSF 310 indicates the timestamp in microseconds (us) when the first bit of the TSF field of the beacon frame was transmitted to an air interface.

The receipt time measurer 804 measures receipt times of beacon frames according to the STA's clock. For example, the receipt time measurer 804 measures a first receipt time of a first beacon frame and measures a second receipt time of a second beacon frame. In some examples, the first receipt time and second receipt time are respectively measured in response to receiving the TSF fields of the first beacon frame and the second beacon frame. In some examples, the first receipt time and the second receipt time are respectively measured in response to receiving the beacon heads of the first beacon frame and the second beacon frame.

The reference time determination component 806 determines a reference time interval. In some examples, the reference time determination component 806 determines the reference time interval based on a difference between transmission times of two consecutive beacon frames. In some examples, the reference time determination component 806 determines the reference time interval based on a difference between TSF values of two consecutive beacon frames. In some other examples, the reference time determination component 806 determines the reference time interval based on the transmission times and/or TSF values of any two beacon frames.

The STA time interval determination component 808 determines an STA time interval. In some examples, the STA time interval determination component 808 determines the STA time interval based on the difference between receipt times of two beacon frames according to the STA's clock.

The Delta REF-STA time value determination component 810 determines a delta REF-STA time value based on the difference between the reference time interval and the STA time interval. In some examples, the delta REF-STA time value indicates the extent to which the STA's clock is faster or slower than the access point's clock over one or more single beacon intervals. In some examples, the delta REF-STA time value indicate the extent to which the STA's clock is faster or slower than the absolute time over the one or more single beacon intervals.

The Delta REF-STA time value normalizing component 812 calculates a normalized delta REF-STA time value to represent an estimated rate of deviation of the STA's clock relative to the absolute time over a predetermined beacon interval (e.g., 102400 μs or 102.4 ms).

The TBTT determination component 814 determines a target beacon transmission time (TBTT) of a subsequent beacon frame. In some examples, the TBTT determination component 814 determines the TBTT of the subsequent beacon frame based on the transmission time of a current beacon frame transmitted from the access point and a predetermined beacon interval.

The wake-up time determination component 816 determines an STA wake-up time based on the TBTT of the subsequent beacon frame and an optimal normalized delta REF-STA time value. In some examples, the STA wake-up time accounts for the difference between the access point's clock and the STA's clock. In some examples, the STA wake-up time accounts for the estimated difference (e.g., an optimal normalized delta REF-STA time value) between the STA's clock and the absolute time.

The Sleep/Wake controller 818 controls the STA to enter a power-saving sleep mode and wake up at the determined STA wake-up time. Waking the STA at the optimized wake-up time allows time to prepare for receiving the subsequent beacon frame from the access point.

Figure 9:
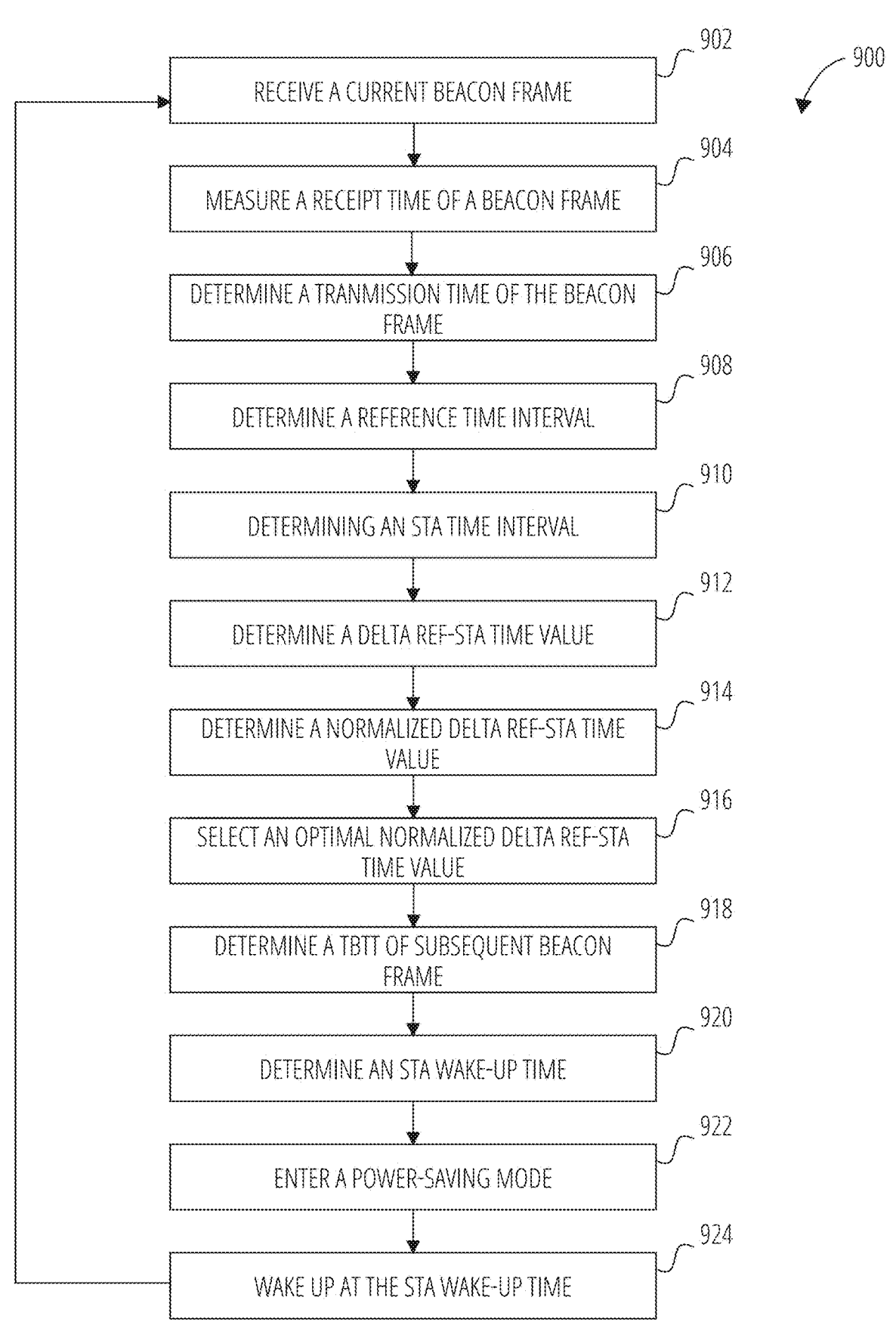
FIG. 9 is a flowchart illustrating method 900 for improving success rate of beacon frame reception, according to some examples.

FIG. 9 is a flowchart illustrating method 900 for improving success rate of beacon frame reception, according to some examples. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

In operation 902, the STA receives a current beacon frame transmitted by the AP. The beacon frame contains a timing synchronization function (TSF) value representing the AP's clock time when the beacon frame was transmitted. The current beacon frame is the most recent beacon frame that the STA has received or processed. In some examples, at any given moment, the current beacon frame refers to the beacon frame that's currently under consideration. A subsequent beacon frame refers to a beacon frame that follows the current beacon frame but needs not be the immediate successor of the current beacon frame; rather, a subsequent beacon frame may be any beacon frame that follows in the sequence, irrespective of the number of beacon frames in between the current beacon frame and the subsequent beacon frame. For example, a subsequent beacon frame may be the first, second, or third beacon frame following the current beacon frame in the order received. Conversely, a preceding beacon frame refers to a beacon frame received prior to the current beacon frame, but a preceding beacon frame needs not be the immediate predecessor of the current beacon frame; rather, a preceding beacon frame may be any beacon frame that precedes the current beacon frame by one or more positions before the current beacon frame.

In operation 904, in response to receiving the current beacon frame, the STA measures a receipt time of the current beacon frame according to the STA's clock. In some examples, the STA measures the receipt time of the current beacon frame based on when the TSF field is received by the STA. In other examples, the STA measures the receipt time when the beacon head of the beacon frame is received.

In operation 906, the STA determines a transmission time of the current beacon frame based on a TSF value included in the current beacon frame. The transmission time is considered a precise indicator of when a beacon frame is sent by the AP. In some examples, the transmission time is accurate within ±20 parts per million (ppm) relative to the absolute time. In some examples, a transmission time is determined based on a calibrated TSF value. Because TSF value is determined according to the AP's clock, and when the inaccuracy of the AP's clock (i.e., the rate of deviation of the AP's clock relative to the absolute time) is known, the TSF value can be calibrated based on this inaccuracy. Alternatively, a TSF value may be calibrated using an estimated clock inaccuracy (e.g., an optimal normalized delta STA-AP time value) of the AP's clock; therefore, the first transmission time may be determined based on the first TSF value and the optimal normalized delta STA-AP time value. In some examples, the AP's clock is precise, closely tracking the absolute time with accuracy within ±20 ppm. In these examples, a TSF value associated with a beacon frame is also precise, so the TSF value is used as a basis for determining the transmission time of the beacon frame.

In operation 908, the STA determines a reference time interval. The reference time interval may be considered to be an accurate measurement of a duration between transmissions of two beacon frames by the AP. In some examples, the reference time interval is determined based on the difference between the TSF value of the current beacon frame and a TSF value of the preceding beacon frame. In some examples, the reference time interval is determined based on a difference between the transmission time of the current beacon frame and a transmission time of the preceding beacon frame. For example, if the transmission time of the current beacon frame is 211.6 ms and the transmission time of the preceding beacon frame is 110.0 ms, then the reference time interval is 211.6 ms−110.0 ms=101.6 ms.

In operation 910, the STA determines an STA time interval. The STA time interval represents a time interval between receiving of the current beacon frame and the preceding beacon frame according to the STA's clock. In some examples, the STA time interval is determined based on a difference between a receipt time of the current beacon frame and a receipt time of the preceding beacon frame. If the STA time interval is longer than the reference time interval, this may be an indication that the STA's clock is faster than the absolute time, and vice versa.

In operation 912, the STA determines a delta REF-STA time value based on the difference between the reference time interval determined in operation 908 and the STA time interval determined in operation 910. The delta REF-STA time value may estimate the extent to which the STA's clock is faster or slower than the absolute time. In some examples, if the transmission times used to calculate the length of the reference time interval are based on the time when the TSF fields are transmitted to the air interface, then the receipt times used to calculate the length of the STA time interval needs to represent the time when the TSF fields are received by client station 106, ensuring that both time measurements are made using the same reference (e.g., TSF field).

In operation 914, the STA calculates a normalized delta REF-STA time value based on the delta REF-STA time value determined in operation 912. This normalized value estimates the timing difference between the STA's clock and the absolute time, over a beacon interval of the same length (e.g., a predetermined beacon interval of 102.4 ms). Determining the normalized delta REF-STA time value helps account for variances in the lengths of beacon intervals. In some examples, lengths of STA time intervals and reference time intervals vary due to factors like network traffic, causing the amount of inaccuracy introduced by the STA's clock to differ across STA time intervals. Therefore, determining normalized delta REF-STA time values helps assess the STA's clock deviation with a consistent perspective. In some examples, the normalized delta REF-STA time value is determined by multiplying the delta REF-STA time value by the predetermined beacon interval and dividing by the reference time interval. In some examples, the normalized delta REF-STA time values may be determined based on the delta REF-STA time value, the predetermined beacon interval, and the reference time interval. Specifically, the normalized delta REF-STA time value equals delta REF-STA time value multiplied by the predetermined beacon interval and divided by the reference time interval, that is, normalized delta REF-STA time value=delta REF-STA time value× predetermined beacon interval/reference time interval. In some examples, the STA time interval is used instead of reference time interval.

In operation 916, the STA selects an optimal normalized delta REF-STA time value. In some examples, the STA selects the optimal normalized delta REF-STA time value after at least two normalized delta REF-STA time values have been determined (i.e., operations 902-914 have been repeated for at least once). The optimal normalized delta REF-STA time value may be a basis for determining the STA wake-up time that ensures the STA to wake up before the transmission of the subsequent beacon frame. In some examples, delta REF-STA time values are calculated as reference time intervals minus STA time intervals, the resulting normalized delta REF-STA time values are negative if the STA time interval is longer than the reference time intervals, indicating that the STA's clock is faster than either the AP's clock or the absolute time. Conversely, the resulting normalized delta REF-STA time values are positive if the STA's clock is slower.

In some examples, the STA selects a maximum value of the at least two normalized delta REF-STA time values as the optimal normalized delta REF-STA time value based on all normalized delta STA-AP time values are non-negative values, because the STA's clock is slower than the AP's clock and adding the maximum value to the STA's clock ensures the STA timely wake up from the power-saving mode. For example, if the normalized delta REF-STA time values include 2, 4, 5 ms, the STA selects the normalized delta REF-STA time value of 5 ms as the optimal normalized delta REF-STA time value because it is the maximum value.

In some examples, the delta REF-STA time values are calculated as STA time intervals minus the reference time intervals, the signs would flip, but the underlying logic of compensating for the inaccuracy in the STA's clock remain unchanged.

In other examples, the STA selects zero as the optimal normalized delta REF-STA time value based on at least one of the at least two normalized delta REF-STA time values is negative as adjusting the faster STA's clock is optional because the STA will wake up early. In some other examples, the STA selects the optimal normalized delta REF-STA time value from the at least two normalized delta REF-STA time values.

In operation 918, the STA determines the TBTT of a subsequent beacon frame. In some examples, the STA determines the TBTT of the subsequent beacon frame based on the TSF value of the current beacon frame and the predetermined beacon interval. In some examples, the STA determines the TBTT of the subsequent beacon frame based on the transmission time of the current beacon frame and the predetermined beacon interval. In some examples, the STA determines the TBTT of the subsequent beacon frame as follows: the STA calculates a current cycle number corresponding to the current beacon frame by performing a floor division of the TSF value of the current beacon frame by the predetermined beacon interval. For example: [110.0/102.4] =1. Client station 106 then calculates the TBTT of the subsequent beacon frame by multiplying a next beacon cycle number (i.e., the current cycle number +1) by the predetermined beacon interval. For example, $(1+1) \times 102.4$ ms=204.8 ms.

In operation 920, the STA determines an STA wake-up time based on the TBTT of the subsequent beacon frame and the optimal normalized delta REF-STA time value. Waking up at the STA wake-up time will account for the difference between the AP's clock and the STA's clock, allowing the STA to wake up in time to receive the subsequent beacon frame. In some examples, the STA wake-up time is determined by either adding to or subtracting from the TBTT, the optimal normalized delta REF-STA time value and other additional offsets such as hardware preparation time (e.g., time needed to initialize the transceiver, to activate the antenna, etc.). For example, if the TBTT of a subsequent beacon frame is 204.8 ms and the optimal normalized delta REF-STA time value is 5 ms, and the other additional offset is 0.3 ms, the STA wake-up time is 204.8−5−0.3=199.5 ms.

In operation 922, the STA enters a power-saving mode in response to determining the STA wake-up time. The power-saving mode (i.e., sleep mode) allows the STA to conserve power and extend battery life when it does not need to receive or transmit data. The STA may power down some of its components while in the power-saving mode.

In operation 924, the STA wakes up at the determined STA wake-up time to prepare for receiving the subsequent beacon frame. For example, if the STA wake-up time is 199.5 ms, the STA would wake up when the STA's clock reaches 199.5 ms. Waking the STA at the STA wake-up time from the power-saving mode allows time for the STA to power up its transceiver and other components so it is ready to receive the next beacon frame at the TBTT. Waking the STA at the STA wake-up time also prevents the STA from either waking too early and wasting power or waking up too late and missing the beacon frame altogether. The STA wake-up time determined based on the optimal normalized delta REF-STA time value optimizes the when to exit power-saving mode to account for the inaccuracy in STA's clock.

In some examples, operations 902 through 924 are repeated for one or more times before proceeding to subsequent operations in order to receive one or more additional beacon frames, thereby obtaining both the current beacon frame and the preceding beacon frame. In some examples, operations 902-924 are repeated for multiple pairs of current and preceding beacon frames in order to determine multiple normalized delta REF-STA time values. For example, the first normalized delta REF-STA time value may be calculated based on a first pair of current beacon frame and preceding beacon frames received by the STA. Additional normalized delta REF-STA time values can be determined based on subsequent pairs of beacon frames.

In some examples, in response to determining the optimal normalized delta REF-STA time value, the STA only repeats a subset of operations in the method 900. For examples, the STA repeats only operations 902 and 918-924 for subsequent beacon frames. The STA will not determine additional normalized delta REF-STA time values. The STA may continue using the previously determined optimal normalized delta REF-STA time value to adjust the STA wake-up time.

In some examples, client station 106 performs method 900 repeatedly in response to performing operation 924 to further refine the optimal normalized delta REF-STA time value, thereby further improving the estimated inaccuracy in the STA's clock. In some examples, client station 106 performs method 900 repeatedly to obtain two or more optimal normalized delta REF-STA time values, and client station 106 selects the maximum value among the two or more optimal normalized delta REF-STA time values as a refined optimal normalized delta REF-STA time value.

In some examples, in response to detecting a predetermined number of failures to receive a beacon frame (e.g., 3 missed beacon frames), the STA re-initiates the method 900 because missing beacon frames indicate that the previously determined optimal normalized delta REF-STA time value may need adjustment to avoid further missing beacon frames. Optionally, before re-initiating the method 900, the STA sets its STA wake-up time a predefined amount earlier than the TBTT of the subsequent beacon frame to make sure that the STA is likely to receive a subsequent beacon frame. For example, if the TBTT of the subsequent beacon frame is 921.6 ms, the STA will set the STA wake-up time to be 880 ms to increase the likelihood of receiving the subsequent beacon frame.

In some examples, the method described herein is not limited to apply only to consecutive beacon frames. For instance, the STA time interval and reference time interval may be determined based on non-consecutive beacon frames. As an example, the STA time interval could be calculated based on the receipt times of the first received beacon frame and the fourth received beacon frame, skipping the second and third beacon frames in between.

Similarly, the reference time interval could be determined based on the transmission times of the first beacon frame and fourth beacon frame, ignoring the transmission times of the second and third frames, which the STA may have failed to receive. In essence, the method described herein can flexibly utilize non-successive beacon frames to establish the timing intervals as long as the intervals are based on the same set of beacon frames. This provides more flexibility when the STA fails to receive beacon frames.

The systems and methods described in the description to FIGS. 1-7 provides effective techniques for compensating for inaccuracy in AP's clock in wireless networks. By analyzing timing patterns of received beacon frames, the client station estimates the AP's clock's inaccuracy. The client station's wake-up schedule (e.g., STA wake-up time) is then adjusted to account for the estimated inaccuracy in AP's clock. In the description of FIGS. 8-9, it includes systems and methods for compensating for inaccuracy in STA's clock. The systems and methods described in FIGS. 1-7 may first calibrate and compensate for any inaccuracies in the AP's clock. Once the AP's clock is calibrated, one can follow the process of using the AP's clock as a reference to calibrate the STA's clock. Alternatively, one may first calibrate the STA's clock using the AP's clock as a reference, and then apply the methods from FIGS. 8-9 to compensate for any inaccuracies in that initial calibration.

As a consequence, this allows the client device to wake up from power-saving mode at the right moments to ensure reliable beacon frame reception while minimizing power consumption. Key advantages may include optimizing client device wake-up times, reducing client device power consumption, and maintaining robust beacon frame reception in the presence of inaccuracies in either the AP's clock or STA's clock.

EXAMPLES

Example 1 is a method, comprising: determining, by one or more processors of a client station (STA), a reference time interval based on a difference between a second transmission time of a second beacon frame and a first transmission time of a first beacon frame; determining, by the one or more processors of the STA, an STA time interval based on a difference between a second receipt time of the second beacon frame and a first receipt time of the first beacon frame; determining, by the one or more processors of the STA, a delta REF-STA time value based on the determined reference time interval and the determined STA time interval; determining, by the one or more processors of the STA, a normalized delta REF-STA time value based on the delta REF-STA time value, a predetermined beacon interval, and the reference time interval; determining, by the one or more processors of the STA, a target beacon transmission time (TBTT) of a subsequent beacon frame based on a transmission time of a current beacon frame and a predetermined beacon interval; determining, by the one or more processors of the STA, an STA wake-up time based on the TBTT of the subsequent beacon frame and the normalized delta REF-STA time value; and waking, by the one or more processors of the STA, the STA from a power-saving mode at the STA wake-up time to prepare for receiving the subsequent beacon frame.

In Example 2, the subject matter of Example 1 includes, wherein the normalized delta REF-STA time value is determined by multiplying the delta REF-STA time value by the predetermined beacon interval and dividing by the reference time interval.

In Example 3, the subject matter of Examples 1-2 includes, wherein the normalized delta REF-STA time value is a first normalized delta REF-STA time value; and the method further comprises: receiving one or more additional beacon frames; for each beacon frame of the one or more additional beacon frames, measuring a receipt time of the each beacon frame of the one or more additional beacon frames according to an STA's clock; determining an additional reference time interval based on a difference between a transmission time of the each beacon frame of the one or more additional beacon frames and a transmission time of a preceding beacon frame; determining an additional STA time interval based on a difference between the receipt time of the each beacon frame of the one or more additional beacon frames and a receipt time of the preceding beacon frame; determining an additional delta REF-STA time value based on a difference between the additional reference time interval and the additional STA time interval; and determining an additional normalized delta REF-STA time value based on the additional delta REF-STA time value, a predetermined beacon interval, and the additional reference time interval, resulting in one or more additional normalized delta REF-STA time values; and selecting an optimal normalized delta REF-STA time value from the one or more additional normalized delta REF-STA time values and the first normalized delta REF-STA time value; and wherein the STA wake-up time is determined based on the TBTT of the subsequent beacon frame and the optimal normalized delta REF-STA time value.

In Example 4, the subject matter of Examples 1-3 includes, determining the transmission time of the each beacon frame of the one or more additional beacon frames based on a timing synchronization function (TSF) value of the each beacon frame of the one or more additional beacon frames; and wherein the additional reference time interval is determined based on a difference between the TSF value of the each beacon frame of the one or more additional beacon frames and a TSF value of a preceding beacon frame.

In Example 5, the subject matter of Examples 1-4 includes, wherein the optimal normalized delta REF-STA time value is a maximum value among the one or more additional normalized delta REF-STA time values and the first normalized delta REF-STA time value.

In Example 6, the subject matter of Examples 1-5 includes, wherein the optimal normalized delta REF-STA time value is zero based on the one or more additional normalized delta REF-STA time values and the first normalized delta REF-STA time value comprising at least one negative number.

In Example 7, the subject matter of Examples 1-6 includes, wherein: the additional reference time intervals are first additional reference time intervals; the additional STA time intervals are first additional STA time intervals; the additional delta REF-STA time values are first additional delta REF-STA time values; the additional normalized delta REF-STA time values are first additional normalized delta REF-STA time values; and the optimal normalized delta REF-STA time value is a first optimal normalized delta REF-STA time value; and the method further comprising: detecting a predetermined number of consecutive failures to receive beacon frames from an access point; re-initiating following operations in response to detecting the predetermined number of consecutive failures to receive beacon frames from the access point: receiving at least two additional beacon frames; for each beacon frame of the at least two additional beacon frames, measuring a receipt time of the each beacon frame of the at least two additional beacon frames according to the STA's clock; determining a second additional reference time interval based on a difference between a transmission time of the each beacon frame of the at least two additional beacon frames and a transmission time of a preceding beacon frame; determining a second additional STA time interval based on a difference between the receipt time of the each beacon frame of the at least two additional beacon frames and a receipt time of the preceding beacon frame; determining a second additional delta REF-STA time value based on a difference between the second additional reference time interval and the second additional STA time interval; and determining a second additional normalized delta REF-STA time value based on the second additional delta REF-STA time value, a predetermined beacon interval, and the second additional reference time interval, resulting in one or more second additional normalized delta REF-STA time values; and selecting a second optimal normalized delta REF-STA time value from the one or more second additional normalized delta REF-STA time values and the first normalized delta REF-STA time value; and wherein the STA wake-up time is determined based on the TBTT of the subsequent beacon frame and the second optimal normalized delta REF-STA time value.

In Example 8, the subject matter of Example 1-7 includes, determining the transmission time of the each beacon frame of the at least two additional beacon frames based on a TSF value of the each beacon frame of the at least two additional beacon frames; and wherein the second additional reference time interval is determined based on a difference between the TSF value of the each beacon frame of the at least two additional beacon frames and a TSF value of a preceding beacon frame.

In Example 9, the subject matter of Examples 1-8 includes, wherein the TBTT of the subsequent beacon frame is determined based on the receipt time of the current beacon frame and the predetermined beacon interval comprises: determining a current cycle number by performing a floor division of the transmission time of the current beacon frame by the predetermined beacon interval; and determining the TBTT of the subsequent beacon frame based on the current cycle number and the predetermined beacon interval.

Example 10 is at least one machine-readable medium including instructions that, when executed by one or more processors, cause the one or more processors to perform operations to implement of any of Examples 1-9.

Example 11 is a client station comprising means to implement of any of Examples 1-9.

What is claimed is:

1. A method, comprising:
determining, by one or more processors of a client station (STA), a reference time interval based on a difference between a second transmission time of a second beacon frame and a first transmission time of a first beacon frame;
determining, by the one or more processors of the STA, an STA time interval based on a difference between a second receipt time of the second beacon frame and a first receipt time of the first beacon frame;
determining, by the one or more processors of the STA, a delta REF-STA time value based on the determined reference time interval and the determined STA time interval;
determining, by the one or more processors of the STA, a normalized delta REF-STA time value based on the delta REF-STA time value, a predetermined beacon interval, and the reference time interval;
determining, by the one or more processors of the STA, a target beacon transmission time (TBTT) of a subsequent beacon frame based on a transmission time of a current beacon frame and a predetermined beacon interval;
determining, by the one or more processors of the STA, an STA wake-up time based on the TBTT of the subsequent beacon frame and the normalized delta REF-STA time value; and
waking, by the one or more processors of the STA, the STA from a power-saving mode at the STA wake-up time to prepare for receiving the subsequent beacon frame.

2. The method of claim 1, wherein the normalized delta REF-STA time value is determined by multiplying the delta REF-STA time value by the predetermined beacon interval and dividing by the reference time interval.

3. The method of claim 1, wherein the normalized delta REF-STA time value is a first normalized delta REF-STA time value; and the method further comprises:
receiving one or more additional beacon frames;
for each beacon frame of the one or more additional beacon frames,
measuring a receipt time of the each beacon frame of the one or more additional beacon frames according to an STA's clock;
determining an additional reference time interval based on a difference between a transmission time of the each beacon frame of the one or more additional beacon frames and a transmission time of a preceding beacon frame;
determining an additional STA time interval based on a difference between the receipt time of the each beacon frame of the one or more additional beacon frames and a receipt time of the preceding beacon frame;
determining an additional delta REF-STA time value based on a difference between the additional reference time interval and the additional STA time interval; and
determining an additional normalized delta REF-STA time value based on the additional delta REF-STA time value, a predetermined beacon interval, and the additional reference time interval, resulting in one or more additional normalized delta REF-STA time values; and
selecting an optimal normalized delta REF-STA time value from the one or more additional normalized delta REF-STA time values and the first normalized delta REF-STA time value; and
wherein the STA wake-up time is determined based on the TBTT of the subsequent beacon frame and the optimal normalized delta REF-STA time value.

4. The method of claim 3, further comprising:
determining the transmission time of the each beacon frame of the one or more additional beacon frames based on a timing synchronization function (TSF) value of the each beacon frame of the one or more additional beacon frames; and
wherein the additional reference time interval is determined based on a difference between the TSF value of the each beacon frame of the one or more additional beacon frames and a TSF value of a preceding beacon frame.

5. The method of claim 3, wherein the optimal normalized delta REF-STA time value is a maximum value among the one or more additional normalized delta REF-STA time values and the first normalized delta REF-STA time value.

6. The method of claim 3, wherein the optimal normalized delta REF-STA time value is zero based on the one or more additional normalized delta REF-STA time values and the first normalized delta REF-STA time value comprising at least one negative number.

7. The method of claim 3, wherein:
the additional reference time intervals are first additional reference time intervals;
the additional STA time intervals are first additional STA time intervals;
the additional delta REF-STA time values are first additional delta REF-STA time values;

the additional normalized delta REF-STA time values are first additional normalized delta REF-STA time values; and the optimal normalized delta REF-STA time value is a first optimal normalized delta REF-STA time value; and the method further comprising:

detecting a predetermined number of consecutive failures to receive beacon frames from an access point;

re-initiating following operations in response to detecting the predetermined number of consecutive failures to receive beacon frames from the access point:

receiving at least two additional beacon frames;

for each beacon frame of the at least two additional beacon frames, measuring a receipt time of the each beacon frame of the at least two additional beacon frames according to the STA's clock;

determining a second additional reference time interval based on a difference between a transmission time of the each beacon frame of the at least two additional beacon frames and a transmission time of a preceding beacon frame;

determining a second additional STA time interval based on a difference between the receipt time of the each beacon frame of the at least two additional beacon frames and a receipt time of the preceding beacon frame;

determining a second additional delta REF-STA time value based on a difference between the second additional reference time interval and the second additional STA time interval; and determining a second additional normalized delta REF-STA time value based on the second additional delta REF-STA time value, a predetermined beacon interval, and the second additional reference time interval, resulting in one or more second additional normalized delta REF-STA time values; and selecting a second optimal normalized delta REF-STA time value from the one or more second additional normalized delta REF-STA time values and the first normalized delta REF-STA time value; and wherein the STA wake-up time is determined based on the TBTT of the subsequent beacon frame and the second optimal normalized delta REF-STA time value.

8. The method of claim 7, further comprising:

determining the transmission time of the each beacon frame of the at least two additional beacon frames based on a TSF value of the each beacon frame of the at least two additional beacon frames; and wherein the second additional reference time interval is determined based on a difference between the TSF value of the each beacon frame of the at least two additional beacon frames and a TSF value of a preceding beacon frame.

9. The method of claim 1, wherein the TBTT of the subsequent beacon frame is determined based on the receipt time of the current beacon frame and the predetermined beacon interval comprises:

determining a current cycle number by performing a floor division of the transmission time of the current beacon frame by the predetermined beacon interval; and determining the TBTT of the subsequent beacon frame based on the current cycle number and the predetermined beacon interval.

10. A client station comprising:

one or more processors; and a non-transitory memory storing instructions that, when executed by the one or more processors, configure the client station (STA) to:

determine a reference time interval based on a difference between a second transmission time of a second beacon frame and a first transmission time of a first beacon frame;

determine an STA time interval based on a difference between a second receipt time of the second beacon frame and a first receipt time of the first beacon frame;

determine a delta REF-STA time value based on the determined reference time interval and the determined STA time interval;

determine a normalized delta REF-STA time value based on the delta REF-STA time value, a predetermined beacon interval, and the reference time interval;

determine a target beacon transmission time (TBTT) of a subsequent beacon frame based on a TSF value of a current beacon frame and a predetermined beacon interval;

determine an STA wake-up time based on the TBTT of the subsequent beacon frame and the normalized delta REF-STA time value; and wake the STA from a power-saving mode at the STA wake-up time to prepare for receiving the subsequent beacon frame.

11. The client station of claim 10, wherein the normalized delta REF-STA time value is determined by multiplying the delta REF-STA time value by the predetermined beacon interval and dividing by the reference time interval.

12. The client station of claim 10, wherein the normalized delta REF-STA time value is a first normalized delta REF-STA time value; and the client station is further configured to:

receive one or more additional beacon frames;

for each beacon frame of the one or more additional beacon frames, measure a receipt time of the each beacon frame of the one or more additional beacon frames according to an STA's clock;

determine an additional reference time interval based on a difference between a transmission time of the each beacon frame of the one or more additional beacon frames and a transmission time of a preceding beacon frame;

determine an additional STA time interval based on a difference between the receipt time of the each beacon frame of the one or more additional beacon frames and a receipt time of the preceding beacon frame;

determine an additional delta REF-STA time value based on a difference between the additional reference time interval and the additional STA time interval; and determine an additional normalized delta REF-STA time value based on the additional delta REF-STA time value, a predetermined beacon interval, and the additional reference time interval, resulting in one or more additional normalized delta REF-STA time values; and select an optimal normalized delta REF-STA time value from the one or more additional normalized delta REF-STA time values and the first normalized delta REF-STA time value; and wherein the STA wake-up time is determined based on the TBTT of the subsequent beacon frame and the optimal normalized delta REF-STA time value.

13. The client station of claim 12, wherein the client station is further configured to:

determine the transmission time of the each beacon frame of the one or more additional beacon frames based on a timing synchronization function (TSF) value of the each beacon frame of the one or more additional beacon frames; and wherein the additional reference time interval is determined based on a difference between the TSF value of the each beacon frame of the one or more additional beacon frames and a TSF value of a preceding beacon frame.

14. The client station of claim 12, wherein the optimal normalized delta REF-STA time value is a maximum value among the one or more additional normalized delta REF-STA time values and the first normalized delta REF-STA time value.

15. The client station of claim 12, wherein the optimal normalized delta REF-STA time value is zero based on the one or more additional normalized delta REF-STA time values and the first normalized delta REF-STA time value comprising at least one negative number.

16. The client station of claim 12, wherein:

the additional reference time intervals are first additional reference time intervals;

the additional STA time intervals are first additional STA time intervals;

the additional delta REF-STA time values are first additional delta REF-STA time values;

the additional normalized delta REF-STA time values are first additional normalized delta REF-STA time values; and the optimal normalized delta REF-STA time value is a first optimal normalized delta REF-STA time value; and the client station is further configured to:

detect a predetermined number of consecutive failures to receive beacon frames from an access point;

re-initiate following operations in response to detecting the predetermined number of consecutive failures to receive beacon frames from the access point:

receive at least two additional beacon frames;

for each beacon frame of the at least two additional beacon frames, measure a receipt time of the each beacon frame of the at least two additional beacon frames according to the STA's clock;

determine a second additional reference time interval based on a difference between a transmission time of the each beacon frame of the at least two additional beacon frames and a transmission time of a preceding beacon frame;

determine a second additional STA time interval based on a difference between the receipt time of the each beacon frame of the at least two additional beacon frames and a receipt time of the preceding beacon frame;

determine a second additional delta REF-STA time value based on a difference between the second additional reference time interval and the second additional STA time interval; and determine a second additional normalized delta REF-STA time value based on the second additional delta REF-STA time value, a predetermined beacon interval, and the second additional reference time interval, resulting in one or more second additional normalized delta REF-STA time values; and select a second optimal normalized delta REF-STA time value from the one or more second additional normalized delta REF-STA time values and the first normalized delta REF-STA time value; and wherein the STA wake-up time is determined based on the TBTT of the subsequent beacon frame and the second optimal normalized delta REF-STA time value.

17. The client station of claim 16, wherein the client station is further configured to:

determine the transmission time of the each beacon frame of the at least two additional beacon frames based on a TSF value of the each beacon frame of the at least two additional beacon frames; and wherein the second additional reference time interval is determined based on a difference between the TSF value of the each beacon frame of the at least two additional beacon frames and a TSF value of a preceding beacon frame.

18. A non-transitory computer-readable storage medium including instructions that when executed by one or more processors of a client station (STA), cause the client station to:

determine a reference time interval based on a difference between a second transmission time of a second beacon frame and a first transmission time of a first beacon frame;

determine an STA time interval based on a difference between a second receipt time of the second beacon frame and a first receipt time of the first beacon frame;

determine a delta REF-STA time value based on the determined reference time interval and the determined STA time interval;

determine a normalized delta REF-STA time value based on the delta REF-STA time value, a predetermined beacon interval, and the reference time interval;

determine a target beacon transmission time (TBTT) of a subsequent beacon frame based on a TSF value of a current beacon frame and a predetermined beacon interval;

determine an STA wake-up time based on the TBTT of the subsequent beacon frame and the normalized delta REF-STA time value; and wake the STA from a power-saving mode at the STA wake-up time to prepare for receiving the subsequent beacon frame.

19. The non-transitory computer-readable storage medium of claim 18, wherein the normalized delta REF-STA time value is determined by multiplying the delta REF-STA time value by the predetermined beacon interval and dividing by the reference time interval.

20. The non-transitory computer-readable storage medium of claim 18, wherein the normalized delta REF-STA time value is a first normalized delta REF-STA time value and the instructions further cause the client station to:

receive one or more additional beacon frames;

for each beacon frame of the one or more additional beacon frames, measure a receipt time of the each beacon frame of the one or more additional beacon frames according to an STA's clock;

determine an additional reference time interval based on a difference between a transmission time of the each beacon frame of the one or more additional beacon frames and a transmission time of a preceding beacon frame;

determine an additional STA time interval based on a difference between the receipt time of the each beacon frame of the one or more additional beacon frames and a receipt time of the preceding beacon frame;

determine an additional delta REF-STA time value based on a difference between the additional reference time interval and the additional STA time interval; and determine an additional normalized delta REF-STA time value based on the additional delta REF-STA time value, a predetermined beacon interval, and the additional reference time interval, resulting in one or more additional normalized delta REF-STA time values; and select an optimal normalized delta REF-STA time value from the one or more additional normalized delta REF-STA time values and the first normalized delta REF-STA time value; and wherein the STA wake-up time is determined based on the TBTT of the subsequent beacon frame and the optimal normalized delta REF-STA time value.

* * * * *